United States Patent
Tredoulat et al.

(10) Patent No.: US 6,789,894 B2
(45) Date of Patent: Sep. 14, 2004

(54) FRAME FOR RETRACTABLE SPECTACLES WITH ENDOGENOUS ARTICULATIONS

(76) Inventors: René Tredoulat, 98 Avenue Galliéni, F-78110, Le Vesinet (FR); Fabio Fratti, 6 Via Laveno, IT-20148, Milano (IT)

( * ) Notice: Subject to any disclaimer, the term of this patent is extended or adjusted under 35 U.S.C. 154(b) by 0 days.

(21) Appl. No.: 10/468,330

(22) PCT Filed: Feb. 15, 2002

(86) PCT No.: PCT/FR02/00584
§ 371 (c)(1),
(2), (4) Date: Aug. 16, 2003

(87) PCT Pub. No.: WO02/067040
PCT Pub. Date: Aug. 29, 2002

(65) Prior Publication Data
US 2004/0070725 A1 Apr. 15, 2004

(30) Foreign Application Priority Data
Feb. 16, 2001 (FR) .......................................... 01 02127

(51) Int. Cl.[7] ................................................. G02C 5/00
(52) U.S. Cl. ...................... 351/140; 351/121; 351/153; 16/228
(58) Field of Search .................................. 351/111, 118, 351/119, 121, 140, 153; 16/228

(56) References Cited
U.S. PATENT DOCUMENTS
6,296,355 B1 * 10/2001 Rittmann .................... 351/111

* cited by examiner

*Primary Examiner*—Huy Mai
(74) *Attorney, Agent, or Firm*—Dennis G. LaPointe; Mason Law, P.L.

(57) ABSTRACT

A spectacles frame comprising two temples (12, 14), a frame body (10) having housing-forming means (22) inside which the temple bodies (12A, 14A) can be housed and from which said temple bodies can be extracted, and retaining means for retaining each of the first temple end portions inside said housing-forming means (22). Each of the first temple end portions has a retaining head, and each end portion (23', 23") of the housing-forming means (22) is provided with at least one constriction which is suitable for retaining a respective one of the retaining heads. Each temple body (12A, 14A) has a flexible zone (14E) which has flexibility greater than the flexibility of an ordinary portion of said temple (12A, 14A) and which can form a bend (12F, 14F) suitable for being opened out for penetrating into the housing-forming means (22).

25 Claims, 5 Drawing Sheets

FRAME FOR RETRACTABLE SPECTACLES WITH ENDOGENOUS ARTICULATIONS

The present invention relates to a spectacles frame comprising:

two temples, each of which has a temple body lying between a first temple end portion and a second temple end portion;

a frame body having housing-forming means inside which both of the first temple end portions are housed, and into which each of the temple bodies can be inserted via respective ones of a first opening and of a second opening in said housing-forming means so as to take up a rest position, said temple bodies being suitable for being extracted from said housing-forming means so as to take up an in-use position, said housing-forming means having a first end portion and a second end portion situated respectively in the vicinities of said first and second openings; and retaining means for retaining each of said first temple end portions in said in-use position, in a respective one of said first end portion and said second end portion of said housing-forming means, each of said first temple end portions being provided with a retaining head.

Patent Document FR 2 735 878 discloses a spectacles frame of the type having rectractable temples, and having housing-forming means which, in the vicinity of each end portion, are provided with hinge means, each of which has an inside channel which, depending on its position, can be aligned with the housing-forming means or not aligned therewith. Each channel can be placed in a first position in which the corresponding retractable temple can be inserted into the housing-forming means by passing through the channel. When the channel is in a second position, each temple is disposed in an in-use position out of the housing-forming means. Each temple is further provided with a head which enables the temple to be retained by bearing against a surface of the hinge member, and each hinge member is further provided with a resilient member suitable for projecting into the channel to co-operate with a concave zone formed in the temple, so as to hold said temple in its extracted position.

Thus, those hinge members are relatively complex because they are secured to the frame body while being mounted to move relative thereto, and each of them is made up of an assembly of parts so as to enable the temples to pass through them each time a changeover takes place between the rest position and the in-use position, the hinge members not being inserted into the housing-forming means.

The hinge means thus remain visible, even in the rest position. In order to prevent them from being too visible, which spoils appearance, the hinge members must be miniaturized, which complicates manufacturing them and increases the cost of them.

An object of the present invention is to remedy those drawbacks by proposing spectacles frames having rectractable temples that are simpler to manufacture and that have fewer parts.

This object is achieved by means of the facts that each of said end portions of said housing-forming means is provided with at least a first constriction which is suitable for retaining the respective retaining head inside said housing-forming means; and that, in the vicinity of said first temple end portion, each temple body has a flexible zone which has flexibility greater than the flexibility of an ordinary portion of said temple and which, in the in-use position, forms a bend suitable for being opened out for penetrating into the housing-forming means.

In the in-use position, the flexible zone has a bend which replaces known hinge members and constitutes an "endogenous" hinge. Thus, in the rest position, only the second temple end portion remains visible and projects from the frame body. However it may project to a small extent only, and, if it is curved, it may come to be placed against the sides of the lenses.

The flexible zone has flexibility sufficient for the bend to be deformed very easily, and preferably in the preferred direction only, corresponding to the movement of opening and closing the bend.

In this zone, the flexibility is greater than in the ordinary portion of the temple, and therefore, in order to obtain deformation of equal amplitude, the forces that need to be exerted in the flexible zone are very considerably smaller than the force that need to be exerted in the ordinary portion of the temple. As a result, the ordinary portion continues to have sufficient strength. In particular, when the temple is to be inserted into the housing-forming means, firstly the ordinary portion of the temple is moved so as to open the bend, so that said ordinary portion is placed in alignment with the housing-forming means, and then thrust is exerted in the longitudinal direction of the ordinary portion of the temple. Because of its high flexibility, the flexible portion does not tend to exert large opposing forces preventing it from entering the housing-forming means. The ordinary portion is of strength sufficient to prevent it from bowing under the action of the longitudinal force that is applied to it.

In addition, the deformation of the flexible zone is elastic, i.e. it is reversible. As soon as said flexible zone is out of the housing-forming means, it naturally takes up its bent shape again.

In addition, the flexible zone is sufficiently resilient and flexible to be easily deformed repeatedly, without breaking, between a first extreme position and a second extreme position. The first position, to which the flexible zone returns naturally when it is not subjected to any stress, corresponds to a position in which the flexible zone forms the bend, while the second position, obtained by opening out the angle defining the bend at rest corresponds to the position in which the flexible zone can penetrate into the housing-forming means.

The housing-forming means further enable the flexible zone to keep the bend opened out to the necessary extent throughout the duration of the rest position, by having, as explained below, abutments for the first temple end portion.

The first constriction is provided in each end portion of the housing-forming means so as to retain the retaining head of the temple while said temple is being extracted from said housing-forming means. For this purpose, said first constriction has a small dimension in at least a first direction. The person skilled in the art can orient said direction of the constriction as a function of the shape and of the position of the retaining head.

Advantageously, each of said end portions of said housing-forming means is further provided with a second constriction in the vicinity of each first constriction, which second constriction has a small dimension in a second direction, said second direction being transverse to said first direction.

This second constriction makes it possible firstly to guarantee that the retaining head is retained securely if the first constriction is insufficient, and secondly to prevent the temple in the in-use position from moving, by coming into contact with the first temple end portion. In said in-use position, the first constriction retains the retaining head while the second constriction co-operates with that temple portion which is situated between the head and the bend.

Advantageously, each of said end portions of said housing-forming means is further provided with a third constriction closer to the opening adjacent to said end portion, which third constriction has a small dimension in said second direction.

When the third constriction is associated with the second constriction, the temple end portion which, in the in-use position, remains inside the housing-forming means, is braced against the second and third constrictions, thereby preventing the temple from moving to any extent.

Each of said end portions of said housing-forming means is further provided with a fourth constriction which is analogous to the first constriction, but which is closer to the opening.

Considered together, the four constrictions define eight abutment points for the temples, which points make it possible to facilitate inserting the temples into the housing-forming means by guiding said temples.

In a first embodiment, said housing-forming means are formed by a single tube, and each constriction is formed in said tube which is implemented in one piece. Thus, the temples are inserted into the same tube, which makes it possible to reduce the thickness of the housing-forming means.

In a second embodiment, the housing-forming means comprise a tube and two sleeves inserted into said tube at respective ones of the first and second end portions of said housing-forming means.

As described in more detail below, the shaping of the housing-forming means that makes it possible to retain the retaining heads of the temples may be performed on the sleeves, and in particular on portions of said sleeves that are masked by the tube, so as not to be visible from the outside.

Thus, for each of the end portions of the housing-forming means, the first constriction is advantageously formed by a portion of the sleeve that is inserted into the corresponding end portion.

For each end portion of the housing-forming means, the first constriction is advantageously formed by a difference between the cross-section of the sleeve inserted in the tube and the cross-section of the corresponding end portion of the tube, so that the sleeve has an abutment surface for the retaining head. The retaining head of the temple has an intermediate cross-section between the two above-mentioned cross-sections so that it can be retained against the abutment surface of the sleeve. The cross-sections of the sleeve, of the tube, and of the head that are considered above are measured in the same direction.

Advantageously, for each sleeve, the first constriction is formed at that end of the sleeve which faces towards the inside of said tube.

Thus, the retaining head of the temple is retained inside the tube against the sleeve, while the remainder of the temple can extend outside, in the in-use position.

Advantageously, that end of each sleeve which faces towards the inside of the tube has at least one notch into which the retaining head of the temple co-operating with the corresponding sleeve can be inserted.

Each sleeve has a notch that is oriented in the same plane as the notch containing the retaining head, so that said retaining head can slide inside the notch during a changeover from the rest position to the in-use position and vice versa, and can thus be prevented from turning therein by abutting against the sides of the notch. Thus the notch prevents the temple in question from turning in the housing-forming means.

Advantageously, that end of each sleeve which is situated inside the tube has two notches into at least one of which the retaining head of the temple that co-operates with the corresponding sleeve can be inserted. Advantageously, the geometrical shape of the retaining head and the positions of the notches are chosen so that the retaining head can be inserted into the two notches when the temples are in the in-use position.

Considered together, for each sleeve, the two notches, which are advantageously aligned in the same diametral plane of the sleeve, form additional abutment points which make it possible to retain the temple in question securely in the housing-forming means in the in-use position. When the temple extends out of the housing-forming means, it is subjected to external stresses (handling by the wearer, etc.) which can cause it to turn about its main axis.

Advantageously, for each of said end portions of the housing-forming means, said second constriction is formed by a portion of the sleeve.

The second constriction is formed directly on the sleeve so as to facilitate making the housing-forming means. The tube may then have a circular cross-section, in particular in the vicinities of its openings.

For each sleeve, the second constriction is formed at that end of the sleeve which faces towards the outside of said tube.

As in the first embodiment, said second constriction, taken in combination with the first constriction, prevents the temple from moving in the in-use position, by coming into contact with the first temple end portion. As in the first embodiment, in said in-use position, the first constriction retains the retaining head, while the second constriction co-operates with that portion of the temple which is situated between the head and the bend.

The spectacles frame is further provided with two caps which cover respective ones of said end portions of said housing-forming means, and through which respective ones of the temples pass.

The caps covering the end portions of the housing-forming means cover, in particular, the second constriction which can be visible on the frame, and which can then appear somewhat unattractive. The presence of the caps thus contributes to masking this defect, and even makes it possible to embellish the frame by having a decorative appearance, for example. The end wall of each cap is provided with an opening for passing the corresponding temple.

Thus, in both embodiments, the housing-forming means are provided with at least two constrictions (one at each end), which constrictions are formed either directly on the tube which constitutes the housing-forming means, or by reducing the inside cross-section of such a tube, by means of the presence of two sleeves in said tube.

In order to simplify the construction of the spectacles frames in the two embodiments in question, the temple body and the first temple end portion advantageously form one piece. In fact, it is the temple itself which, by means of the flexible zone, acts as the hinge, without requiring any additional separate coupling element to be mounted.

Advantageously, each temple has a cross-section of parallelogram shape with sides extending in the first and second directions so that each temple cannot turn in said housing-forming means.

When each branch has a cross-section of parallelogram shape with sides extending in two directions, the small dimensions of the first and second constrictions are advantageously oriented in respective ones of the first and second directions so that said branch cannot turn in said housing-forming means.

Advantageously, said bend has a radius of curvature of about 15 millimeters (mm) which, associated with the first and third constrictions which are appropriately spaced apart along the tube, makes it possible to hold the temple securely in the in-use position by means of the sides of the temple abutting against said constrictions.

Advantageously, each temple is heat treated so as to improve the mechanical properties of its component material.

In addition, said flexible zone advantageously has a local zone that is heat treated so as to improve the flexibility of the flexible zone relative to the flexibility of the ordinary portion of the temple.

The various treatments to which the temple is subjected may, for example, be performed while placing a mask over the zones that are not to be treated.

The flexible zone advantageously, and optionally in addition to being heat treated, further has a small section that is smaller than the section of said ordinary portion of the temple body, so as to increase its flexibility. The small section of said temple body may advantageously be obtained by drawing or by machining.

The invention will be better understood and its advantages will appear more clearly on reading the following detailed description of embodiments shown by way of non-limiting example.

The description refers to the accompanying drawings, in which.

Figure 1:
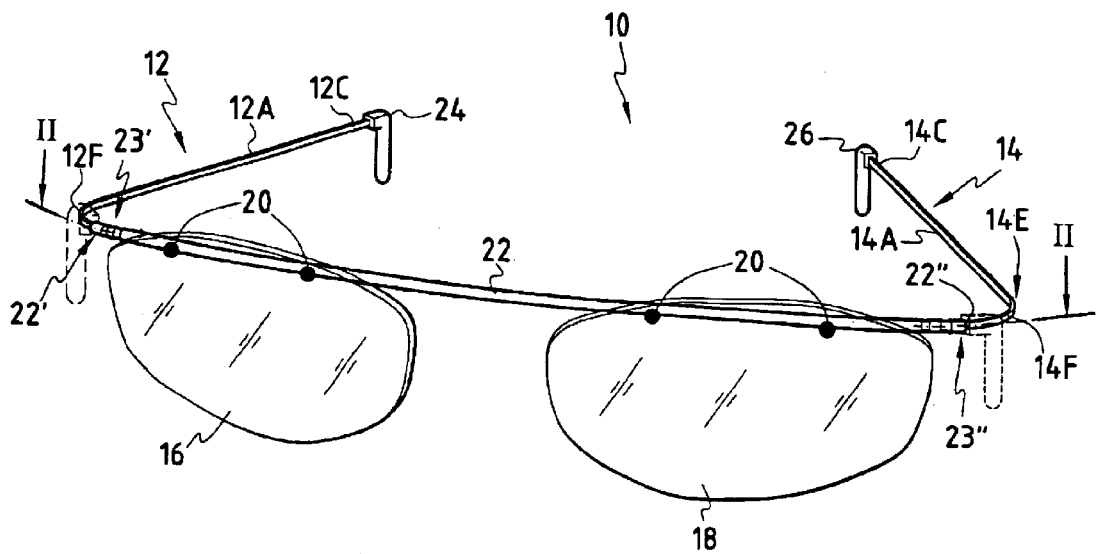
FIG. 1 is a diagrammatic perspective view of a first embodiment of a spectacles frame.

The spectacles frame comprises a frame body 10, two temples 12 and 14 shown in the in-use position in solid lines in FIG. 1, and two lenses 16 and 18. The lenses may be sight-correcting lenses and/or sunglass lenses, depending on the use that is made of the frame. In the example shown, the lenses 16 and 18 are fixed by suitable mechanical elements 20 that are affixed to the frame body 10.

Each temple 12, 14 has a temple body 12A, 14A extending between a first temple end portion 12B, 14B, and a second temple end portion 12C, 14C. The body 12A, 14A and the first temple end portion 12B, 14B are advantageously formed in one piece.

In a first embodiment, the frame body 10 is provided with housing-forming means constituted by a single tube 22 formed in one piece. The first temple end portions 12B and 14B are inserted into the tube 22 respectively via a first opening 22' and via a second opening 22", which openings are disposed respectively at the free end of a first end portion 23' and at the free end of a second end portion 23" of the tube 22. After initial insertion, retaining means that are described below retain said first temple end portions 12A and 14B inside the tube.

In the rest position (shown in dashed in FIG. 1), each temple body 12A, 14A is inserted in the tube 22.

Figure 2:
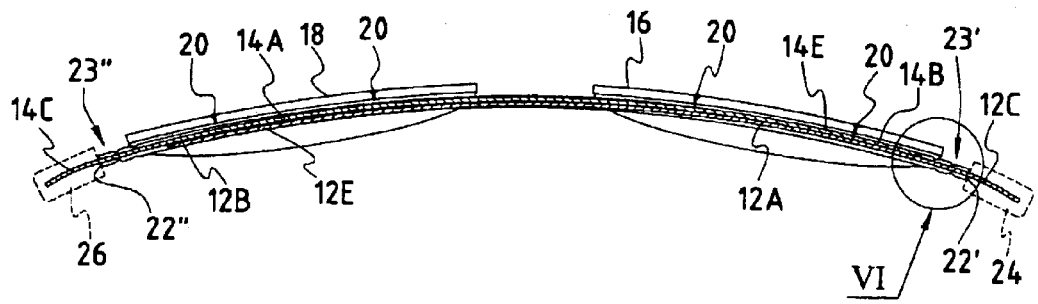
FIG. 2 is a section view on line II—II of FIG. 1, showing the spectacles frame in the rest position.

FIG. 2 shows the rest position, in which the two temple bodies 12A and 14A are housed inside the tube 22. Depending on the geometrical shape of the tube 22 and on the cross-section of the temples 12 and 14, when they are in this rest position, the two temples 12 and 14 are either side-by-side, as shown in FIG. 2, or juxtaposed one above the other. In order to facilitate inserting the temples 12 and 14 into the tube 22, the free end of each first temple end portion 12B and 14B is tapered. Thus, on being inserted into the tube 22, the two temples 12 and 14 mutually deflect each other so as to slide one against the other. This sliding can be facilitated when the first temple end portion 12B, 14B further has a curvature that enables it to come into abutment against the inside wall of the tube 22, when the temple 12, 14 is in the rest position. In which case, the second temple inserted is deformed resiliently to slide along the curvature of the first temple inserted previously.

Figure 3:
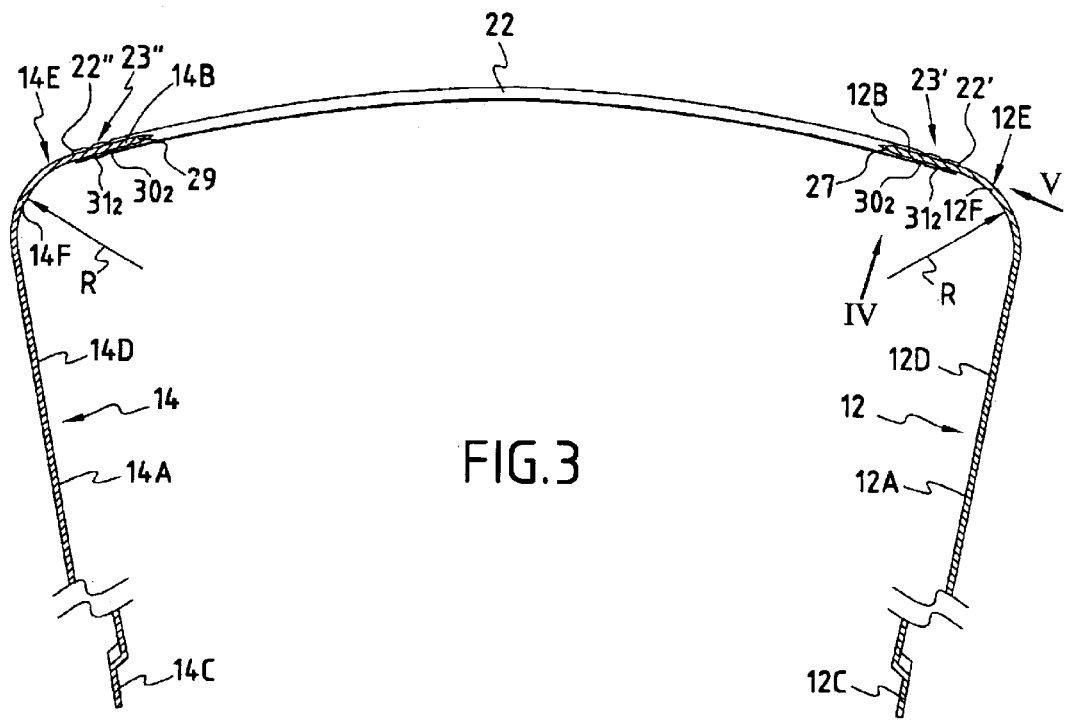
FIG. 3 is a section view analogous to FIG. 2, with the spectacles frame in the in-use position.

FIG. 3 shows the spectacles frame in the in-use position, with the two temple bodies 12A and 14A outside the tube 22. Each of the two temple bodies 12A and 14A has an ordinary portion 12D, 14D which is of medium flexibility so that the temple body is sufficiently rigid to have substantially the strength of a conventional temple, which strength enables the temple body 12A, 14A to perform its function, consisting in keeping the spectacles frame in place on the face of the wearer.

In addition, each of the temple bodies 12A and 14A has a flexible zone 12E, 14E which is of flexibility greater than the flexibility of the respective ordinary portion 12D, 14D. In the in-use position, the flexible zone 12E, 14E forms a bend 12F, 14F which has a radius of curvature R that is preferably about 15 mm.

Firstly, the presence of the two bends 12F and 14F enables the temples 12 and 14 to take up their in-use position naturally whenever the flexible zones 12E and 14E are extracted from the tube 22 over a length that is sufficient. Because of the curvature of the flexible zones 12E and 14E, whenever the ordinary portions of the temples 12D and 14D are out of the tube 22, they are positioned substantially parallel to each other and substantially transversely to the lenses 16 and 18, as in a spectacles frame having conventional temples.

Secondly, because of the flexibility of the zones 12E and 14E, the temple bodies 12A and 14A can easily be inserted into the tube 22 so as to take up their rest position. Merely by opening the angle of the bend 12F, 14F by manually moving the temples 12 and 14 apart, thereby bringing the ordinary portions 12D and 14D into alignment with the tube 22, it is possible to deform the flexible zones 12E and 14E so that each temple body 12A, 14A comes to face a respective one of the openings 22' and 22" so that it can be inserted into the tube 22.

Obtaining the flexible zone 12E, 14E requires a plurality of steps to be performed. Each of the temples 12 and 14 is shaped so to form the respective bend 12F, 14F, and they are then heat treated. For this purpose, the component material of the temples is preferably chosen to be an alloy with a high cobalt content (a cobalt content of about 40%), e.g. Nivaflex, Elgiloy, or Phynox, and that can be heat treated for several hours at in the range 350° C. to 550° C.

The flexibility required to obtain a zone that is sufficiently flexible to allow the bend 12F, 14F to be opened out and to be returned to its closed position in reversible manner may be obtained by two different means that may, where applicable, be combined and that may be provided before or after the above-mentioned heat treatment of the temples 12 and 14, which means comprise a reduction in cross-section and/or heat treatment as explained below.

Thus, the difference in flexibility between the flexible zone 12E, 14E, and the ordinary portion 12D, 14D may be obtained by reducing the section of the flexible zone by drawing or machining the flexible zone 12E, 14E.

The small section 12E, 14E varies uniformly in at least one direction transverse to its length. For example, with the height of the temple remaining unchanged, its thickness may vary continuously from an initial thickness of 0.4 mm which is reduced to 0.15 mm, and then increased again to 0.4 mm. Thus, for example, about every 3 mm, the following dimensions may be provided: 0.40 mm; 0.30 mm; 0.20 mm; 0.15 mm; 0.20 mm; 0.30 mm; and 0.40 mm. It is also possible to reduce the cross-section in both of its dimensions.

For example, it has been observed that by selecting the temples 12 and 14 to be made of Phynox and to have, in the ordinary portions 12D and 14D a cross-section of 2 mm by 4 mm, the desired mechanical qualities are obtained by subjecting said temples 12 and 14 to hardening by heating at 500° C. in a controlled atmosphere for three hours, and by machining the bent flexible zones 12F and 14F of the temples 12 and 14 to the above-mentioned variations in dimensions. The difference in flexibility between the flexible zone 12E, 14E, and the ordinary portion 12D, 14D may also be obtained by local heat treatment, optionally in addition to reducing the section of the above-mentioned flexible zone 12E, 14E.

For example, after performing the hardening treatment on the entire temples 12 and 14, and after reducing the cross-section of the flexible zones 12E and 14E, it is possible to perform local heat treatment on the flexible zones 12E an 14E. For this purpose, it is advantageously possible to protect the portions that are not to be subjected to the treatment with an appropriately disposed mask (not shown), in particular over the ordinary portions 12D and 14D, and over the second temple end portions 12C and 14C which must remain less flexible.

Each of the second temple end portions 12C and 14C may be provided with a spatula 24, 26, e.g. fixed by known means to the temple end portion 12C, 14C. The spatulas 24 and 26 make it possible to provide the temples 12 and 14 with earpieces for retaining them behind the ears of the wearer, in order to hold the frame 10 securely, they must therefore be fixed rigidly to the temple end portions 12C and 14C. The spatulas 24 and 26 may be judiciously chosen to be adaptable to the morphology of the user by manual deformation. It is also possible to provide rectilinear temples 12 and 14 that clamp the head of the user lightly beyond the ears in order to hold the frame in place. In which case too, the second end portions 12C and 14C must be sufficiently rigid.

Figure 4:
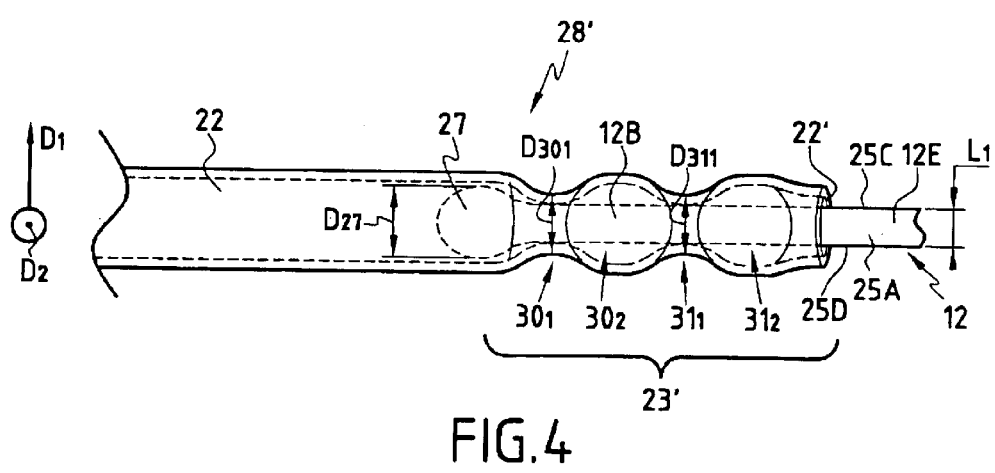
FIG. 4 is a view of the retaining means, seen looking along arrow IV in FIG. 3.
Figure 5:
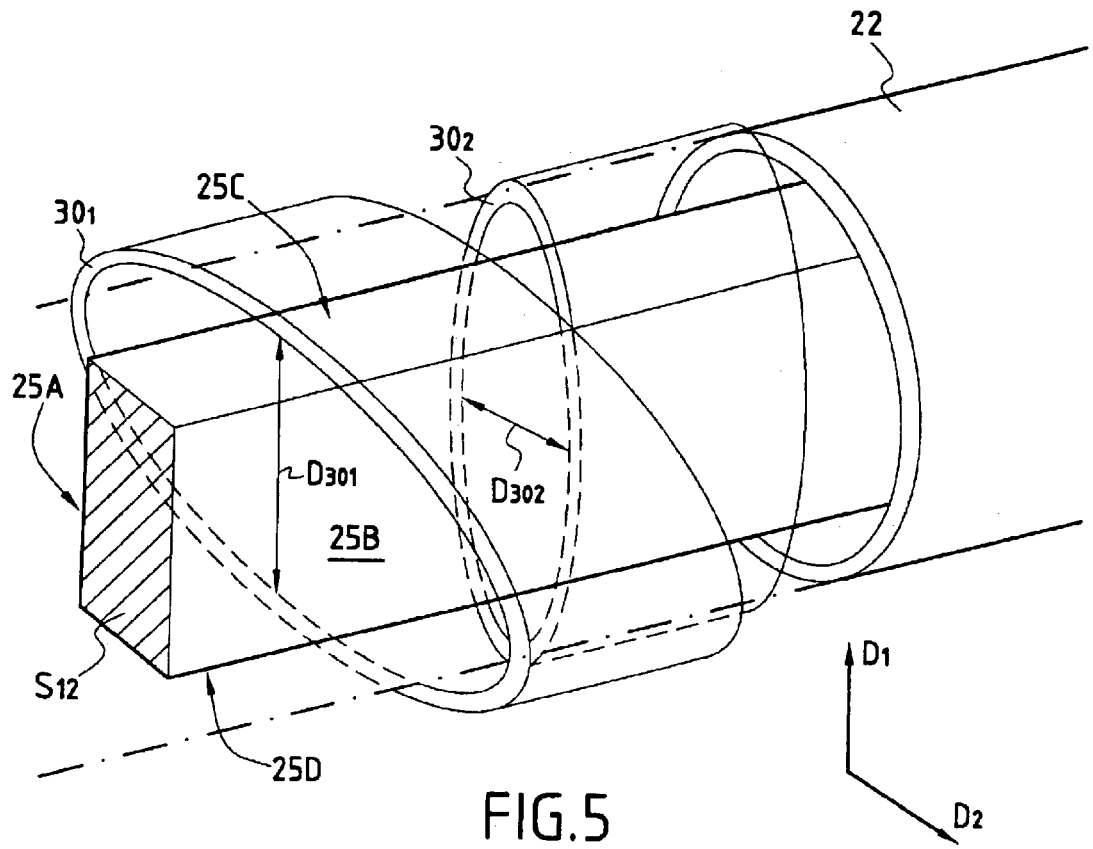
FIG. 5 is a diagrammatic perspective view seen looking along arrow V of FIG. 3, showing in particular the principle of the first and second constrictions considered individually.

FIGS. 4 and 5 show details of the retaining means 28'. In the remainder of the description, reference is made to temple 12 only, even though similar retaining means 28" are present in the vicinity of the other end portion 22' of the tube 22 for the purpose of retaining the temple 14.

Advantageously, the cross-section $S_{12}$ of the temple 12 may be a parallelogram with sides extending in two directions $D_1$ and $D_2$. The two directions $D_1$ and $D_2$ may be substantially perpendicular so that the section $S_{12}$ is rectangular with sides 25A and 25B that are substantially parallel to each other in the direction $D_1$ and that are of identical length, and sides 25C and 25D that are substantially parallel to each other in the direction $D_2$, and that are of identical length. When the four sides 25A to 25D are of the same length, the cross-section $S_{12}$ is square.

For example, as shown in FIG. 4, the retaining means 28' comprise a retaining head 27 which, considered in the direction $D_2$, forms a disk 27 which has at least one diameter $D_{27}$, measured in the direction $D_1$, that is greater than the length $L_1$ of the cross-section $S_{12}$ of the temple 12 in the same direction.

In general, in at least one direction transverse to the length of the temple 12, the retaining head 27 has a dimension greater than the ordinary dimension of the temple body 12A in the same direction. In the remainder of the description, said transverse direction is considered to be $D_1$, and, in said direction $D_1$, the dimensions of the retaining head 27 and the ordinary dimension of the temple body 12A are considered respectively to be $D_{27}$ and $L_1$.

In this configuration, the retaining means 28' further comprise a first constriction $30_1$ formed in the tube 22 in the first end portion 23' of the tube 22 and that has a small dimension $D_{301}$ in the first direction $D_1$, as shown in FIG. 4. Said small dimension $D_{301}$ is smaller than the dimension $D_{27}$ of the retaining head 27, so that said head is retained securely while the temple 12 is being extracted from the tube 22, but is very slightly greater than $L_1$ so that the temple body 12A can re-enter the tube 22 without any particular effort being required.

In the vicinity of the first constriction $30_1$, the tube 22 is provided with a second constriction $30_2$ which has a small dimension $D_{302}$ which extends in the direction $D_2$. Depending on the geometrical shape of the temple 12 described, the two constrictions $30_1$ and $30_2$ are thus substantially orthogonal, thereby preventing any rotation of the temple 12 in the tube 22.

In the in-use position, the second constriction $30_2$, associated with the curvature of the first temple end portion 12B, limits the extent to which the temple 12 can move inside the tube 22 in a plane orthogonal to the direction $D_1$. The end of the retaining head 27 comes into abutment against the inside wall of the tube 22, and the sides 25A and 25B come into abutment against the inside walls of the second constriction $30_2$.

A third constriction $31_2$ and a fourth constriction $31_1$ are formed in the end portion 23' of the tube 22 closer to the opening 22'. The third constriction $31_2$ is analogous to the second constriction $30_2$ and has a small dimension $D_{312}$ in the direction $D_2$, while the fourth constriction $31_1$ is analogous to the first constriction $30_1$, and has a small dimension $D_{311}$ in the direction $D_1$.

Figure 6:
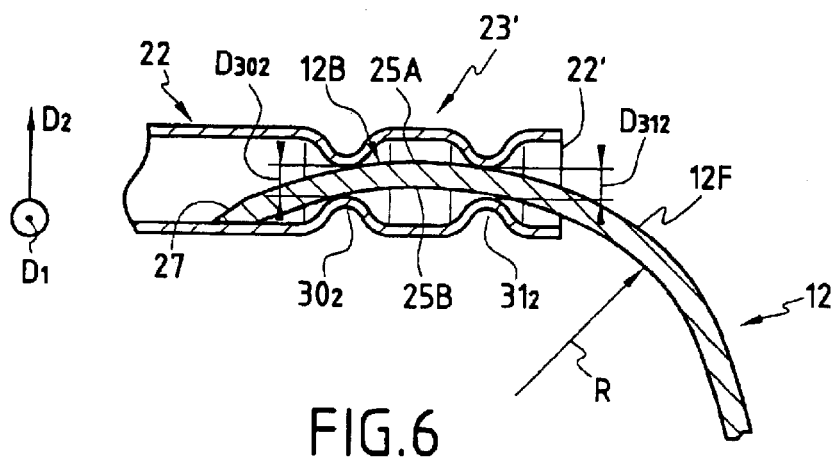
FIG. 6 is a view of the detail VI of the section view of FIG. 2, showing the second and third constrictions with the temples in the in-use position.

In the in-use position, the temple end portion 12B which remains in the tube 22 is braced via its sides 25A and 25B against the second constriction 302 and against the third constriction $31_2$, further limiting the extent to which the temple 12 can move, as shown in FIG. 6. The fourth constriction $31_1$ associated with the first constriction $30_1$ make it possible to reduce the extent to which the temple 12 can move in the other direction, namely in a plane orthogonal to the direction $D_2$, by the sides 25C and 25D bearing against the inside walls of the first constriction $30_1$ and of the fourth constriction $31_1$.

When all four constrictions $30_1$, $30_2$, $31_1$, and $31_2$ are present, they together define eight abutment points, thereby facilitating inserting the temple 12 into the tube 22 by sliding over said eight points.

The constrictions $30_1$, $30_2$, $31_1$, and $31_2$ are formed simply by localized nipping of the tube, in respective ones of the first and second directions $D_1$ and $D_2$.

For this purpose, it is possible, for example, to form the constriction(s) in the second direction $D_2$ (second constriction $30_2$ and/or third constriction $31_2$), and then to insert the temples 12 and 14 which pass through the constrictions without any difficulty because their respective heads 27, 29 extend in the other direction $D_1$; and finally, it is possible to form the constriction(s) in the first direction $D_1$ (the first constriction $30_1$ and optionally the fourth constriction $31_1$) so as to prevent the temples 12 and 14 from being extracted from the tube 22.

It is also possible to form the constrictions $30_1$, $30_2$, $31_1$, and $31_2$ in succession or else simultaneously after the respective heads 27 and 29 of the temples 12 and 14 have been inserted into the tube 22 while care is taken to hold them in place inside the tube 22 until the first constriction $30_1$ is finished.

In a second embodiment shown in FIGS. 7 to 10, the housing-forming means are formed by a tube 122 and by two sleeves 132 respectively inserted into the tube 122 via its openings 122' and 122". The references are unchanged for all of the elements common to the two embodiments, and in particular the temples 12 and 14 are identical. in this second embodiment, the retaining means 128' comprise the respective retaining heads 27 on the temples 12 and 14.

Figure 7:
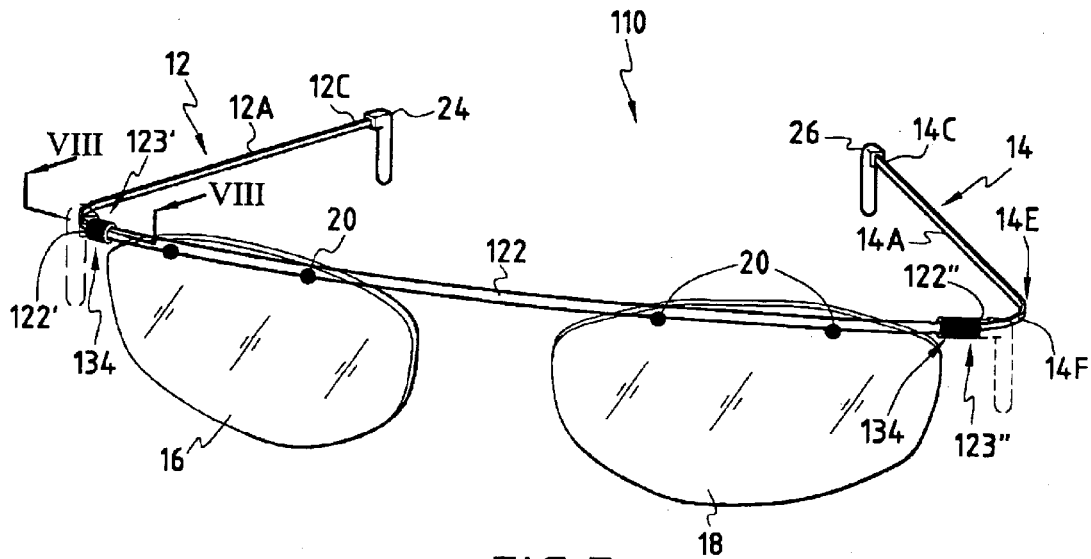
FIG. 7 is a diagrammatic perspective view of a spectacles frame analogous to FIG. 1, in a second embodiment.

In solid lines, FIG. 7 shows the in-use position in which the temples 12 and 14 are out of the tube 122. The rest position, in which the two temples 12 and 14 are housed in the tube 122, is shown in dashed lines.

Each sleeve 132 is inserted at least in part into the tube 122 via respective ones of its first and second openings 122' and 122", so that the sleeves 132 are in the vicinities of respective ones of the first and second end portions 123' and 123" of the housing-forming means.

A cap 134 is disposed on each of the end portions 123' and 123" of the housing-forming means, so as to cover and to mask each of the sleeves 132 and each of the respective openings 122' and 122" of the tube 122, which openings can be rather unattractive in appearance, in particular for a fine frame.

Figure 8:
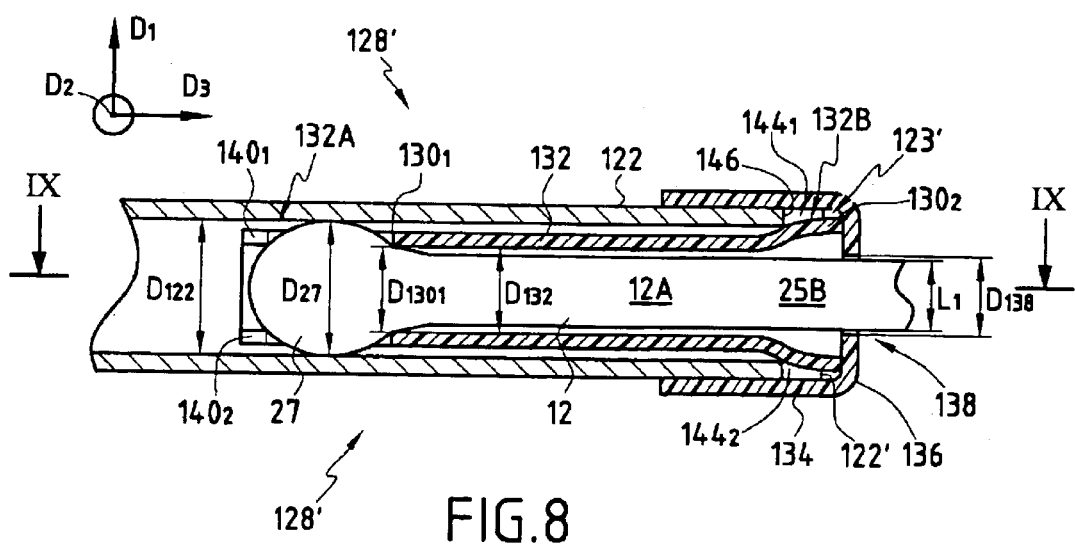
FIG. 8 is a section view on line VIII—VIII of FIG. 7, showing a spectacles frame in the in-use position, showing the retaining means.
Figure 9:
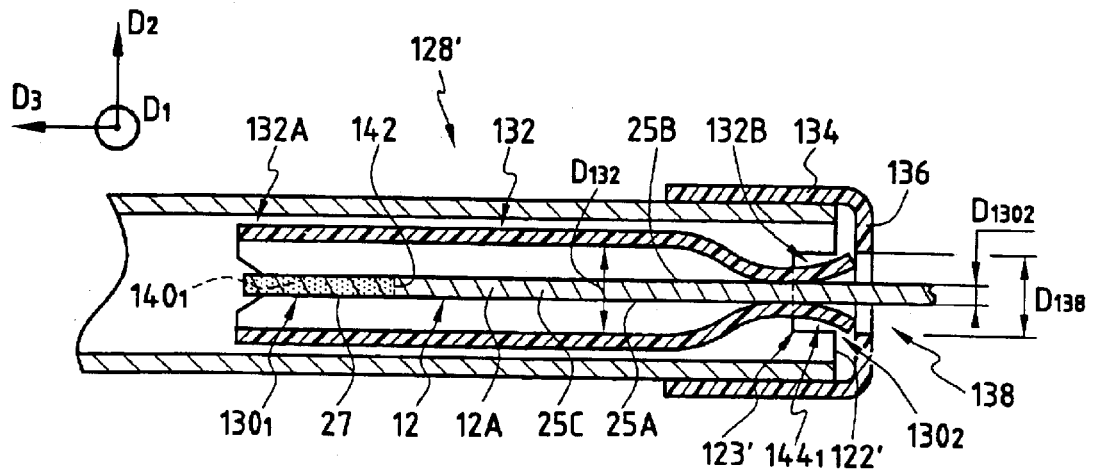
FIG. 9 is a section view on line IX—IX of FIG. 8.
Figure 10:
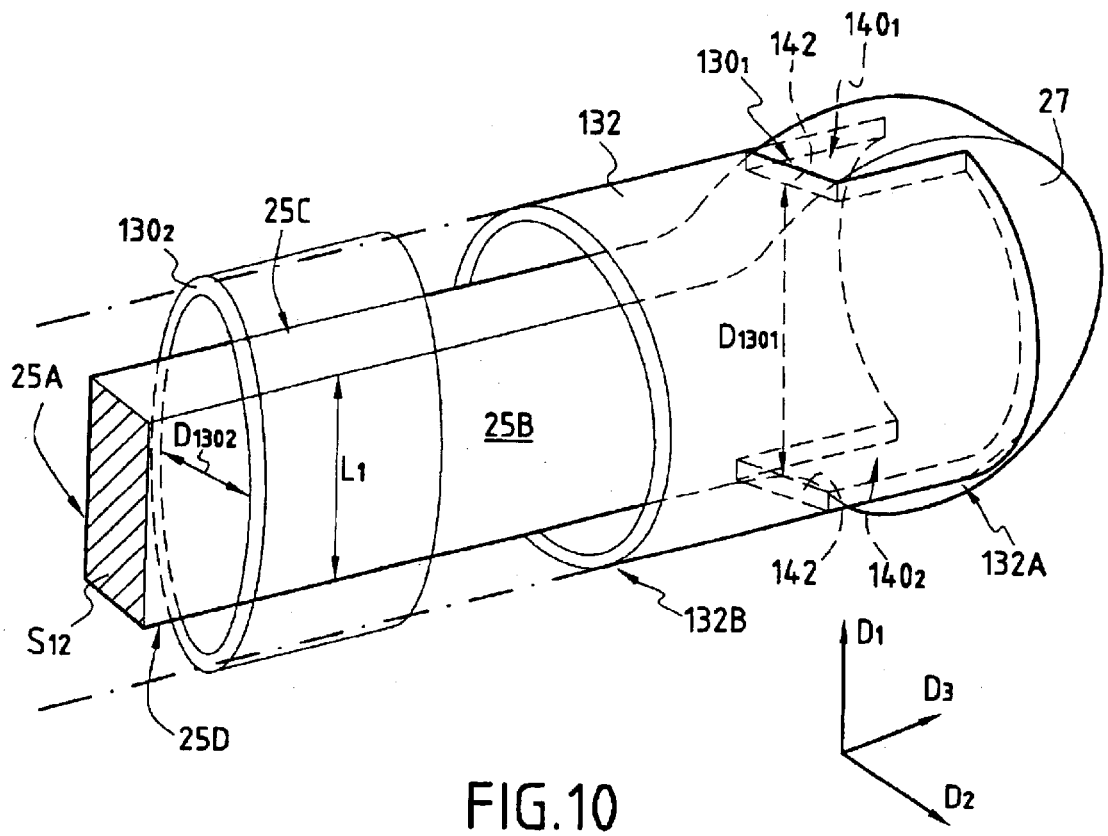
FIG. 10 is a diagrammatic perspective view of a temple held in a sleeve showing in particular the principle of the first and second constrictions.

The caps 134 shown in more detail in FIGS. 8 and 9 are preferably cylindrical and they are fitted onto the outside of the tube 122. The caps 134 may be fixed to said tube by adhesive-bonding or by welding. The end wall 136 of each cap 134 is provided with a through opening 13 of size suitable for allowing the corresponding temple 12 and 14 to pass through it.

The opening 138 in each cap 134 is preferably circular so that such a cap 134 is very simple to make. In order to match as closely as possible the geometrical shape of the temple 12 or 14 which has a rectangular cross-section $S_{12}$ (shown in FIG. 10), the diameter $D_{138}$ of said opening 138 is preferably slightly larger than the larger dimension of the cross-section of the temple, namely the length $L_1$ of the sides 25A and 25B in the first direction $D_1$.

In the remainder of the description, only one end portion 123' of the tube 122 with its sleeve 132 inserted into the end portion 123' is considered, the other end portion with its other sleeve being analogous.

In this second embodiment, the first constriction $130_1$ is formed in the sleeve 132 in the vicinity of its first end 132A which faces towards the inside of the tube 122. In this example, as shown in FIG. 8, the sleeve 132 has a diametral dimension in the first direction $D_1$ that is smaller than the dimension $D_{27}$ of the retaining head 27 of the retaining means 128', while being larger than the ordinary dimension $L_1$ of the temple body 12A.

Thus, the first constriction $130_1$ does not necessarily correspond to a sleeve portion having a diametral dimension that is smaller than the ordinary inside diameter $D_{132}$ of the sleeve 132, but rather it is formed by the reduced dimension between the sleeve 132 and the tube 122, and in this example by a diametral dimension $D_{1301}$ of the sleeve 132 that is smaller than the inside diameter the tube 122.

In addition, the sleeve 132 has two notches $140_1$ and $140_2$ that are diametrically opposite and that extend in a direction $D_3$, i.e. along the length of the sleeve 132 so as to retain the retaining head 27 in the in-use position. Said notches $140_1$, and $140_2$ may, for example be formed simultaneously by means of a saw that moves in the direction $D_3$. The third direction $D_3$ advantageously forms a substantially orthogonal reference frame with the first and second directions $D_1$ and $D_2$.

Therefore, so long as the retaining head 27 has a diameter $D_{27}$ that is larger than the ordinary inside diameter $D_{132}$ of the sleeve 132, but that is significantly smaller than the ordinary inside diameter $D_{122}$ of the tube 122, the retaining head 27 comes into abutment against the end wall 142 of at least one of the two notches $140_1$, $140_2$. Thus, in the first direction $D_1$, the first constriction $130_1$ has a reduced dimension $D_{1301}$ that is substantially equal to the inside diameter $D_{132}$ of the sleeve 132.

The second constriction $130_2$, preferably formed in the second end 132B of the sleeve 132 that faces towards the outside of the tube 122, genuinely has a reduced dimension $D_{1302}$ in at least one direction. In this example, with the above-described configuration of the retaining head 27, said direction is the second direction $D_2$.

Said dimension $D_{1302}$ is smaller than the ordinary dimension $D_{132}$ of the sleeve 132, so that, in the in-use position, the second constriction $130_2$, associated with the curvature of the first temple end portion 12B, limits the extent to which the temple 12 can move in the sleeve 132, in a plane orthogonal to the first direction $D_1$. The end of the retaining head 27 comes into abutment against the inside wall 142 of at least one notch $140_1$, $140_2$, while the sides 25A and 25B come into abutment against the inside walls of the second constriction $130_2$.

Advantageously, in the first direction $D_1$, the second constriction $130_2$ further has a dimension larger than the ordinary diameter $D_{122}$ of the tube 122, and, in the vicinity its end portion 123', the tube 122 has two notches $144_1$ and $144_2$ in the second direction $D_2$. The notches 144 enable the sleeve 132 to be held securely in the tube 122 by means of the sleeve 132 co-operating substantially continuously with the side walls and end walls of the notches $144_1$ and $144_2$, using the same principle as the principle of the retaining head 27 being retained in the above-mentioned notches $140_1$ and $140_2$ provided in the sleeve 132.

In this example, the second constriction $130_2$ is pressed by the cap 134 against the end wall 146 of at least one of the two notches $144_1$, $144_2$ in the tube 122, thereby tending to press the sleeve 132 towards the inside of said tube. Fixing the sleeve 132 by adhesive-bonding, welding or by any other known fixing means, makes it possible to guarantee that the sleeve 132 is held securely in the tube 122.

What is claimed is:

1. A spectacles frame comprising:
  two temples having a first and a second temple end portion, each of which has a temple body lying between said first temple end portion and said second temple end portion;

a frame body having housing-forming means inside which both of the first temple end portions are housed, and into which each of the temple bodies can be inserted via respective ones of a first opening and of a second opening in said housing-forming means so as to take up a rest position, said temple bodies being suitable for being extracted from said housing-forming means so as to take up an in-use position, said housing-forming means having a first end portion and a second end portion situated respectively in the vicinities of said first and second openings; and retaining means for retaining each of said first temple end portions in said in-use position, in a respective one of said first end portion and said second end portion of said housing-forming means, each of said first temple end portions being provided with a retaining head;

wherein each of said end portions of said housing-forming means is provided with at least a first constriction which is suitable for retaining the respective retaining head inside said housing-forming means; and wherein, in the vicinity of said first temple end portion, each temple body has a flexible zone which has flexibility greater than a flexibility of an ordinary portion of said temple and which, in the in-use position, forms a bend suitable for being opened out for penetrating into the housing-forming means.

2. A spectacles frame according to claim 1, wherein said first constriction has a reduced dimension in at least a first direction.

3. A spectacles frame according to claim 2, wherein each of said end portions of said housing-forming means is further provided with a second constriction in the vicinity of each first constriction, which second constriction has a reduced dimension in a second direction.

4. A spectacles frame according to claim 3, wherein said second direction is transverse to said first direction.

5. A spectacles frame according to claim 3, wherein each of said end portions of said housing-forming means is further provided with a third constriction closer to the opening, which third constriction has a reduced dimension in said second direction.

6. A spectacles frame according to claim 5, wherein each of said end portions of said housing-forming means is further provided with a fourth constriction which is analogous to the first constriction, but which is closer to the opening.

7. A spectacles frame according to claim 6, wherein said housing-forming means are formed by a single tube, and wherein said first, second, third and fourth constructions are formed in said tube which is implemented in one piece.

8. A spectacles frame according to claim 5, wherein said housing-forming means are formed by a single tube, and wherein said first, second and third constructions are formed in said tube which is implemented in one piece.

9. A spectacles frame according to claim 3, wherein each temple has a cross-section of parallelogram shape with sides extending in the first and second directions so that each temple cannot turn in said housing-forming means.

10. A spectacles frame according to claim 3, wherein said housing-forming means are formed by a single tube, and wherein said first and second constructions are formed in said tube which is implemented in one piece.

11. A spectacles frame according to claim 1, wherein the housing-forming means comprise a tube and two sleeves inserted into said tube at respective ones of the first and second end portions of said housing-forming means.

12. A spectacles frame according to claim 11, wherein, for each of said end portions of the tube, said first constriction is formed by a portion of the sleeve that is inserted into said respective end portion.

13. A spectacles frame according to claim 11, wherein an end of each sleeve which faces towards the inside of the tube has at least one notch into which the retaining head of the temple co-operating with the corresponding sleeve can be inserted.

14. A spectacles frame according to claim 11, wherein an end of each sleeve which is situated inside the tube has two notches into at least one of which the retaining head of the temple that co-operates with the corresponding sleeve can be inserted.

15. A spectacles frame according to claim 1, wherein each of said end portions of said housing-forming means is further provided with a second constriction in the vicinity of each first constriction, wherein the housing-forming means comprise a tube and two sleeves inserted into said tube at respective ones of the first and second end portions of said housing-forming means and wherein for each of said end portions of the housing-forming means, said second constriction is formed by a portion of the sleeve.

16. A spectacles frame according to claim 1, further provided with two caps which cover respective ones of said end portions of said housing-forming means, and through which respective ones of the temples pass.

17. A spectacles frame according to claim 1, wherein said housing-forming means are formed by a single tube, and wherein said first constrictions of said end portions of said housing means are formed in said tube which is implemented in one piece.

18. A spectacles frame according to claim 1, wherein the temple body and the first temple end portion form a single piece.

19. A spectacles frame according to claim 1, wherein said bend has a radius of curvature of about 15 mm.

20. A spectacles frame according to claim 1, wherein each temple is heat treated.

21. A spectacles frame according to claim 1, wherein said flexible zone has a local zone that is heat treated.

22. A spectacles frame according to claim 1, wherein said flexible zone further has a small cross-section that is smaller than a cross-section of said ordinary portion of the temple body.

23. A spectacles frame according to claim 22, wherein said small cross-section of said temple body is obtained by drawing.

24. A spectacles frame according to claim 22, wherein said small cross-section of said temple body is obtained by machining.

25. A spectacles frame according to claim 1, wherein each of said end portions of said housing-forming means is further provided with a further constriction which is analogous to the first constriction, but which is closer to the opening.

* * * * *